(12) United States Patent
Krieger et al.

(10) Patent No.: US 10,874,090 B2
(45) Date of Patent: Dec. 29, 2020

(54) DEVICE FOR DIAGNOSING INFESTATION

(71) Applicant: Bayer Animal Health GmbH, Leverkusen (DE)

(72) Inventors: Klemens Krieger, Lindlar (DE); Jörg Habig, Cologne (DE); Ralph Büchler, Kirchhain (DE)

(73) Assignee: Bayer Animal Health GmbH, Leverkuson (DE)

( * ) Notice: Subject to any disclaimer, the term of this patent is extended or adjusted under 35 U.S.C. 154(b) by 474 days.

(21) Appl. No.: 14/916,244

(22) PCT Filed: Sep. 2, 2014

(86) PCT No.: PCT/EP2014/068617
§ 371 (c)(1),
(2) Date: Mar. 3, 2016

(87) PCT Pub. No.: WO2015/032753
PCT Pub. Date: Mar. 12, 2015

(65) Prior Publication Data
US 2016/0212977 A1    Jul. 28, 2016

(30) Foreign Application Priority Data
Sep. 4, 2013   (DE) .................... 20 2013 007 841 U (51) Int. Cl.
*A01K 47/06*        (2006.01)
*A01K 51/00*        (2006.01)

(52) U.S. Cl.
CPC .............. *A01K 47/06* (2013.01); *A01K 51/00* (2013.01)

(58) Field of Classification Search
CPC ......... A01K 47/00; A01K 47/06; A01K 51/00
See application file for complete search history.

(56) References Cited

U.S. PATENT DOCUMENTS 3,968,531 A * 7/1976 Cartwright ............. A01K 47/00
449/30
4,867,731 A    9/1989 Willard et al.
(Continued)

FOREIGN PATENT DOCUMENTS

AT          406001 B        1/2000
DE       3209196 A1        10/1983
(Continued)

OTHER PUBLICATIONS

JP 2011147393 A machine translation (Year: 2011).*
International Search Report issued in PCT/EP2014/068617, dated Dec. 4, 2014, 3 pages.

*Primary Examiner* — Son T Nguyen
(74) *Attorney, Agent, or Firm* — McBee Moore & Vanik IP, LLC (57) ABSTRACT

The invention relates to a device for examining the infestation of honey bee colonies with *Varroa* mites. The device contains a container with a bottom, side walls and a cover. Within the container there is a means which causes the *Varroa* mites to drop off the bees, but does not harm the bees, and a means for fixing the dropped *Varroa* mites to the bottom of the container. The invention furthermore relates to a method of examining the degree of infestation of honey bee colonies with *Varroa* mites using the device according to the invention, and to a method for examining the sensitivity of the *Varroa* mites of a bee colony to various acaricid-containing active compounds using the device according to the invention.

22 Claims, 9 Drawing Sheets

(56) References Cited

U.S. PATENT DOCUMENTS

| | | | |
|---|---|---|---|
| 5,069,651 A | 12/1991 | Arndt | |
| 5,135,429 A * | 8/1992 | Gefen | A01K 49/00 449/2 |
| 5,135,758 A * | 8/1992 | Arnold | A01K 51/00 424/539 |
| 5,211,597 A * | 5/1993 | Scott | A01K 47/00 449/27 |
| 5,230,894 A * | 7/1993 | Robert | A01K 51/00 424/405 |
| 6,468,129 B1 | 10/2002 | Griffith | |
| 2004/0077291 A1 * | 4/2004 | Arthur | A01K 47/06 449/20 |
| 2004/0229542 A1 * | 11/2004 | Ruzicka | A01K 51/00 449/2 |
| 2007/0026765 A1 * | 2/2007 | Renn | A01K 51/00 449/2 |
| 2008/0280528 A1 | 11/2008 | Mudd | |
| 2011/0016770 A1 * | 1/2011 | Buchholz | A01K 51/00 43/107 |
| 2014/0127968 A1 * | 5/2014 | Probasco | A01K 51/00 449/2 |
| 2014/0335760 A1 * | 11/2014 | Huvermann | A01K 47/00 449/30 |

FOREIGN PATENT DOCUMENTS

| | | | |
|---|---|---|---|
| DE | 10054510 A1 | | 5/2002 |
| DE | 10118667 A1 | | 10/2002 |
| DE | 10340308 A1 | | 3/2005 |
| DE | 202011106067 U1 | | 1/2012 |
| DE | 102012001353 A1 | | 7/2013 |
| GB | 2495284 A | | 4/2013 |
| JP | 2004-113081 | | 4/2004 |
| JP | 2006254886 A | * | 9/2006 |
| JP | 3149604 | | 4/2009 |
| JP | 2011147393 A | * | 8/2011 |
| WO | 9214355 A1 | | 9/1992 |

* cited by examiner

DEVICE FOR DIAGNOSING INFESTATION

CROSS-REFERENCE TO RELATED APPLICATIONS

This application is the 371 National Stage Application based on International PCT Application No. PCT/EP2014/068617, filed Sep. 2, 2014, which claims priority to German Patent Application No. 202013007841.3, filed Sep. 4, 2013, the entire disclosures of which are incorporated herein by reference.

The invention relates to a device for examining the infestation of honeybee colonies with *Varroa* mites.

Since around the year 2000, massive bee mortality has been observed in northern America and in Europe. Symptoms are the absence of adult bees in the hive. In contrast, the brood, juvenile bees, honey and pollen are still present. One of the causes for the bee mortality is thought to be the infestation with *Varroa* mites (*Varroa destructor*). The *Varroa* mites were probably introduced into Europe, the middle east, the Americas, Japan and Africa during the second half of the last century and have rapidly spread within the colonies of the European honeybee (*Apis mellifera*). In contrast to their natural host, the Asian honeybee (*Apis cerana*), the European honeybee does not have suitable defence mechanisms, which permits better reproduction and spreading of the mites. Furthermore, *Varroa destructor* is a vector for other pathogenic microorganisms (for example viruses, bacteria). Without effective control of the mites, the bee colonies will die sooner or later. A reliable treatment management against *Varroa* mites or other *Varroa* mites requires individual diagnoses of infestation.

A known method for diagnosing the infestation of bees with *Varroa* mites is the use of a removable bottom liner which is positioned underneath the honeycombs in the beehive. The bottom liner is in most cases an adhesive film to whose adhesive surface *Varroa* mites which drop down will adhere and where they can be counted. It is also known to protect the adhesive film by a grid which is located thereabove so that the *Varroa* mites will drop onto the bottom liner through the mesh of the grid, but the bees cannot reach the bottom liner. Again, the number of *Varroa* mites which adhere to the adhesive film can be counted. Both methods are very unreliable since it is unclear which proportion of the *Varroa* mites of the infested bee colony has been recorded in the first place. Also, substantial amounts of other debris will drop onto the bottom liner so that the dead mites can only be discovered with difficulty unless the bottom liner is cleaned regularly. The known methods are therefore more suited to a qualitative diagnosis of infestation rather than quantitative diagnosis.

A further known method for diagnosing an infestation is what is known as the "icing sugar method", where a certain number of bees in a container whose bottom is perforated is dusted with icing sugar. By shaking the container together with the bees, the *Varroa* mites are separated from the bees and the icing sugar together with the *Varroa* mites which have dropped off leaves the container through the perforated bottom. The icing sugar and the *Varroa* mites can be separated from each other by further screening, and the number of *Varroa* mites which have been separated thus can be recorded. The "icing sugar method" is very complicated and requires a multiplicity of devices.

It is therefore the object of the invention to provide a device and a method by means of which a quantitative diagnosis of the infestation of a honeybee colony with *Varroa* mites can be carried out with little complexity.

The object according to the invention is achieved by a device for examining the infestation of honeybee colonies with *Varroa* mites, containing a container with a bottom, side walls and a cover;

within the container a means which causes the *Varroa* mites to drop off the bees, but does not harm the bees;

means for fixing the dropped *Varroa* mites to the bottom of the container.

The container is made of a material whose rigidity withstands the bees' chewing, for example of plastic material (film or web plates) or metal.

The container can preferably be easy to assemble, to open and, after filling with a bee sample, easy to close.

The device according to the invention can be fixed in a honeycomb frame (empty frame) by suitable retaining means (FIG. 1) as they are typically used in beehives. Table 1 gives an overview of the dimensions of various types of honeycomb frames.

TABLE 1

Explanation: A and B, respectively, are the external dimensions, C and D, respectively, the internal dimensions of the frame top without "ears" and the side bar.

| Name/Hive | A in mm | B in mm | C in mm | D in mm |
|---|---|---|---|---|
| Albertiblatterstock | | | 420 | 270 |
| Allgäu hive system Swiss dimensions, entire | 360 | 284 | | |
| Allgeäu hive system Swiss dimensions, half | 175 | 284 | | |
| Arbeitsblätter hive of the Reichsfachgruppe Imker | | | 223 | 370 |
| Badisch, entire [association's dimensions] | 240 | 420 | 220 | 405 |
| Badisch, half | 240 | 210 | 220 | 195 |
| Berlepsch | | | | |
| Berchdesgarden dimensions | 235 | 370 | | |
| Braun's dimensions | | | | |
| Bremen dimension | 234 | 314 | 345 | 195 |
| Burki crate | | | 270 | 230 |
| Dadant US, brood box | 435 | 300 | 420 | 260 |
| Dadant US, honey box | 435 | 160 | 420 | 135 |
| Dadant Blatt, brood box | 435 | 285 | 410 | 265 |
| Dadant Blatt, honey box | 435 | 159 | 410 | 130 |
| Dadant (American) | 460 | 270 | | |
| Dadant [modified], brood box | 448 | 285 | 428 | 256 |
| Dadant [modified], honey box | 448 | 145 | 428 | 122 |
| Dahte, horizontal honeycombs | 347 | 225 | | |
| Dante, vertical honeycombs | 223 | 360 | | |
| Danish trough hive | 310 | 260 | | |
| Deutsch Normal [standard dimension] | 370 | 223 | 350 | 200 |
| Deutsch Normal, one and a half times | 370 | 338 | 350 | 315 |
| Deutsch Normal, flat | 370 | 159 | 350 | 135 |
| Deutsch Normal, half | 370 | 110 | 350 | 100 |
| Alsace-Lorraine dimensions | 240 | 320 | | |
| French Conference hive | 362 | 362 | | |
| French Central Association dimensions | 320 | 430 | | |
| Freudenstein | 338 | 200 | 315 | 180 |
| Gerstung, horizontal | 410 | 260 | 400 | 250 |
| Gerstung, vertical | 260 | 410 | 250 | 400 |
| Helvetia crate, brood box | 360 | 300 | 344 | 270 |
| Helvetia crate, honey box | 360 | 150 | | |
| [Bayerisches]Hoffmann, small | 370 | 260 | 350 | 235 |
| Hoffmann, large | 410 | 260 | 400 | 250 |
| Holstein dimension | | | 260 | 300 |
| Italian association's | 426 | 261 | | |

TABLE 1-continued

Explanation: A and B, respectively, are the external dimensions, C and D, respectively, the internal dimensions of the frame top without "ears" and the side bar.

| Name/Hive | A in mm | B in mm | C in mm | D in mm |
|---|---|---|---|---|
| dimensions | | | | |
| Yugoslav specialty dimension | 400 | 300 | | |
| Kuntzsch, horizontal | 330 | 250 | 310 | 230 |
| Kuntzsch, vertical | 250 | 335 | 230 | 310 |
| Langstroth, entire | 448 | 232 | 428 | 203 |
| Langstroth, flat, ½ | 448 | 137 | 428 | 108 |
| Langstroth, flat, ⅔ | 448 | 159 | 428 | 130 |
| Langstroth, flat, ¾ | 448 | 185 | 428 | 156 |
| Luftenegg dimension | 420 | 220 | | |
| Schulz's Meisterstock | 350 | 240 | | |
| Austrian horizontal honeycomb | 426 | 255 | 420 | 220 |
| Rheinische ldealbeute (Schneider) | 250 | 420 | | |
| Spaarkast, brood box (Dutch) | 360 | 218 | 340 | 198 |
| Spaarkast, honey box (Dutch) | 360 | 140 | 340 | 120 |
| Spühler crate, brood box | 385 | 335 | 370 | 310 |
| Spühler crate, honey box | 385 | 170 | 370 | 150 |
| Swabian Lager hive (Alsace) | 272 | 362 | | |
| Swiss dimensions, old | 272 | 277 | | |
| Swiss dimensions, new | 340 | 260 | | |
| Swiss crate | 286 | 354 | 270 | 354 |
| Swiss hive, brood box | 288 | 361 | | |
| Swiss hive, honey box | 288 | 177 | | |
| Schleswig-Holstein Wanderbeute | 310 | 260 | | |
| Schwerin dimensions | 472 | 171 | 420 | 145 |
| Sträuslis-Dadant-Alberti frame | 435 | 300 | | |
| Traubling trough hive | 390 | 240 | 370 | 220 |
| Tatran (Czech, Slovak) | 420 | 275 | | |
| Boczonadi hive, entire (Hungarian) | 420 | 360 | | |
| Boczonadi hive, half (Hungarian) | 420 | 180 | | |
| Vienna association stand | 250 | 420 | | |
| Wielkopolski (Polish) | 360 | 260 | | |
| Württemberg, new | 272 | 277 | 250 | 250 |
| Württemberg, old | 272 | 220 | 250 | 200 |
| 1.5 Zander | 420 | 330 | 400 | 300 |
| 4/3 Zander, brood box | 420 | 300 | 400 | 280 |
| 4/3 Zander, honey box | 420 | 150 | 400 | 130 |
| Zander | 420 | 220 | 400 | 191 |
| Zander, half | 420 | 110 | 400 | 90 |
| ZaDant | 420 | 285 | 400 | 265 |
| Zander, flat | 420 | 159 | 400 | 130 |

The dimensions of the container of the device should be such that the height and length of the container remain within those of the internal dimensions of the honeycomb frame used. The width of the container may also be somewhat bigger than the width of the honeycomb frame's bars. Preferably, the device should fill 10% to 50% of the area extending across the honeycomb frame. With suitable dimensions, it is also possible to fix several devices in one honeycomb frame.

The container should have a width w in the range of from 10 mm to 50 mm, preferably in the range of from 20 mm to 35 mm, a length 1 in the range of from 50 mm to 428 mm, preferably in the range of from 100 mm to 200 mm, and a height h in the range of from 20 mm to 405 mm, preferably in the range of from 30 mm to 100 mm.

It is especially preferred for the dimensions of the container to be such that the container is suitable for accommodating a bee sample of approximately 50 g.

If natural leaks of the container do not seem sufficient for providing the bees with oxygen while they dwell in the diagnostic container, the container may have ventilation openings whose dimensions are such that the bees cannot escape through them.

Preferably, the container has an opening of a size through which the bees can escape. Especially preferably, the opening has a diameter in the range of from 7 mm to 20 mm. The opening of the container has a sealing mechanism which permits the bees within the container themselves to open the container after a predetermined period of time and to escape from the container. The predetermined time amounts, if at all possible, to more than 3 hours and ideally more than 6 hours.

The sealing mechanism can consist of a clump of food dough which seals the opening of the container and, perpendicularly to the container wall in which the opening is located, has a thickness in the range of from 10 mm to 30 mm, or can be a small tube filled with food dough, the cross-section of which corresponds to that of the opening of the container and which has a length in the range of from 10 mm to 30 mm. A suitable food dough is, for example, pasty bee food, brand APIFONDA®, manufactured by Südzucker AG, which is mainly composed of sucrose. It contains microfine crystals whose diameter is smaller than $\frac{1}{100}$ millimetres. Each individual crystal is coated by a thin film of syrup consisting of dissolved sugars, which film prevents the coalescence and crusting of the crystals. APIFONDA® can therefore be removed by the bees without any problems and taken up directly by the pharynx. As an alternative, the sealing mechanism may consist of coated paper (for example sticky label), uncoated paper, cardboard, thin wood or similar, which seals the opening of the container. The sealing mechanism is such that it can be chewed away by the bees themselves and is open after the predetermined period of time.

The means for fixing the *Varroa* mites which have dropped off may consist in an adhesive at the bottom of the container, for example an adhesive film with an adhesive side facing the inside of the container. The means for fixing the *Varroa* mites which have dropped off fixes the *Varroa* mites which have dropped off the bees, but does not adversely affect the bees' freedom to move. One adhesive film which is possible is known from the *Varroa* Mite Screen Boards by Dadant & Sons Inc., 51 South 2nd Street, Hamilton, Ill. 62341 (e.g. B41501 *Varroa* Mite Screen Board C/1).

Preferably, a grid (such as that from Dadant & Sons Inc.), which separates the container bottom from the interior of the container and through which the *Varroa* mites, but not bees, may pass, is located on or near the container bottom. The grid typically has a mesh size in the range of 0.5 mm to 6 mm, preferably in the range of 2 mm to 4 mm. This prevents the bees from having direct contact with the adhesive.

The means in the interior of the container which causes the *Varroa* mites to drop off the bees, but does not harm the bee, may be an active compound support with an acaricide-containing active compound which has a selective acaricidal activity. The active compound support is preferably fixed or hung up in the interior of the container and releases the acaricide-containing active compound by contact or as an evaporation device. The active compound support is in as much as this is possible positioned such that the acaricide-containing active compound spreads uniformly in the interior of the container or can be taken up by the bees by contact from the surface of the active compound support. The *Varroa* mites which have dropped off can be recorded at any point in time and provide information on the degree of infestation of the bees. A requirement for treating the bee colony examined can therefrom be derived as is shown in the scheme in Table 2:

TABLE 2

Requirement of a bee colony to be treated when infested with Varroa mites; bee sample size 50 grams

| Month | No treatment required | Treatment required | Acute danger - treatment urgently required |
|---|---|---|---|
| July | 1-4 mites | >5 mites | |
| August | 1-9 mites | >10 mites | |
| September | 1-14 mites | >15 mites | ≥25 mites |

Suitable active compounds with be selective acaricidal activity are, for example, flumethrin, amitraz, coumaphos, tau-fluvalinate, bromopropylate, macrocyclic lactones, organic acids such as formic acid, lactic acid, oxalic acid and essential oils such as thymol, clove oil, citronella oil and their constituents.

The means in the interior of the container may also be a heating medium which heats the interior of the container to temperatures above 36° C., the normal brood temperature of bees. At temperatures of up to 45° C., the bees still remain unharmed, but the Varroa mites are killed or detach themselves "voluntarily" from the bees and drop off.

The device according to the invention can be used for the diagnosis of infestation of a bee colony with Varroa mites. To this end, a device according to the invention is provided and filled with bees. After a period of at least 3 hours, the Varroa mites which have dropped off the bees and adhere to the fixing means are recorded.

Moreover, the device according to the invention can be used for examining the sensitivity of the Varroa mites which are attached to the bee colony to various acaricide-containing compounds, by equipping a plurality of the devices according to the invention with different active compound supports. To this end, at least two of the devices according to the invention are provided, each of which is equipped with active compound supports with different acaricide-containing active compounds. Both devices are filled with bees from the same bee colony. After a period of at least 3 hours, the Varroa mites which have dropped off the bees and adhere to the fixing means are recorded. The numbers of Varroa mites which have been recorded on the fixing means at the bottom of the container are correlated with the respective acaricide-containing active compound so that an opinion can be formed on the activity of the respective acaricide-containing active compound. As a verification test, it is also possible to correlate the Varroa mites which still adhere to the bees with the acaricide-containing active compounds. The determination of the Varroa mites which still adhere to the bees can be carried out by the above-described icing sugar method, which per se is not subject-matter of the invention.

FIGURES AND EXAMPLES

Figure 1:
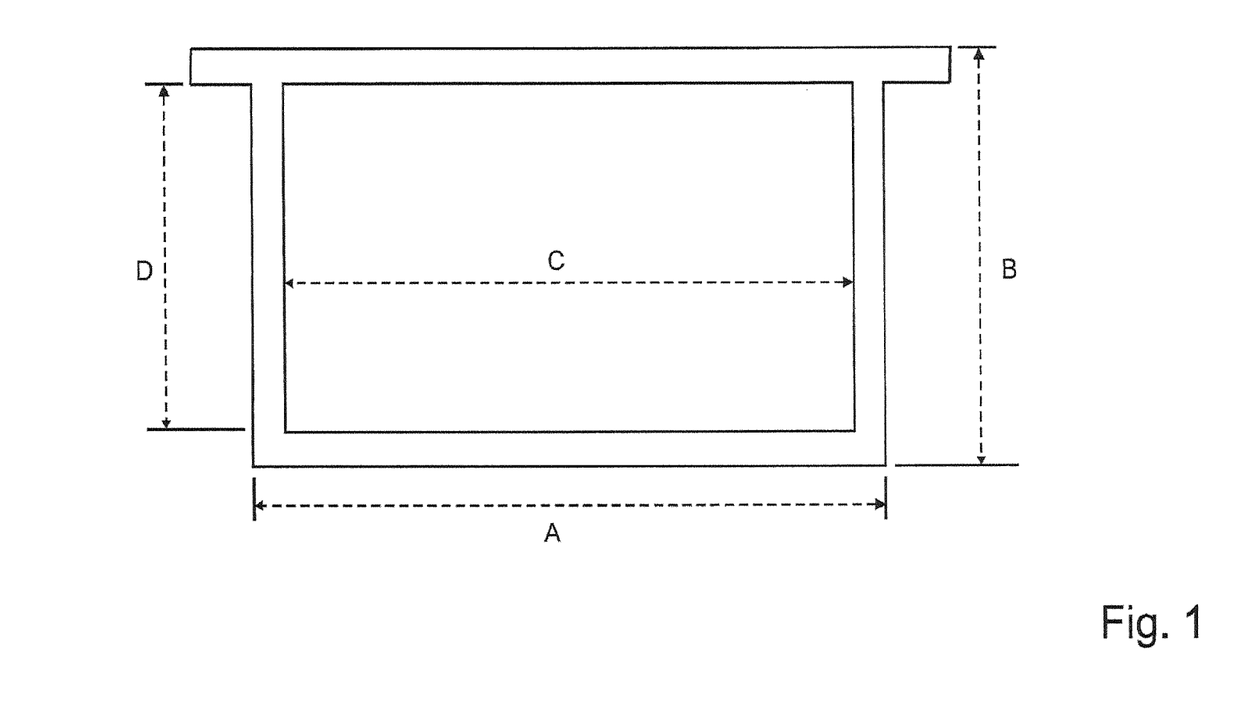
FIG. 1 shows the sketch of a honeycomb frame.

FIG. 1 shows the sketch of a honeycomb frame into which one or more of the device for the diagnosis of infestation according to the invention can be inserted. The possible dimensions of sections A, B, C and D can be seen from Table 1.

Figure 2:
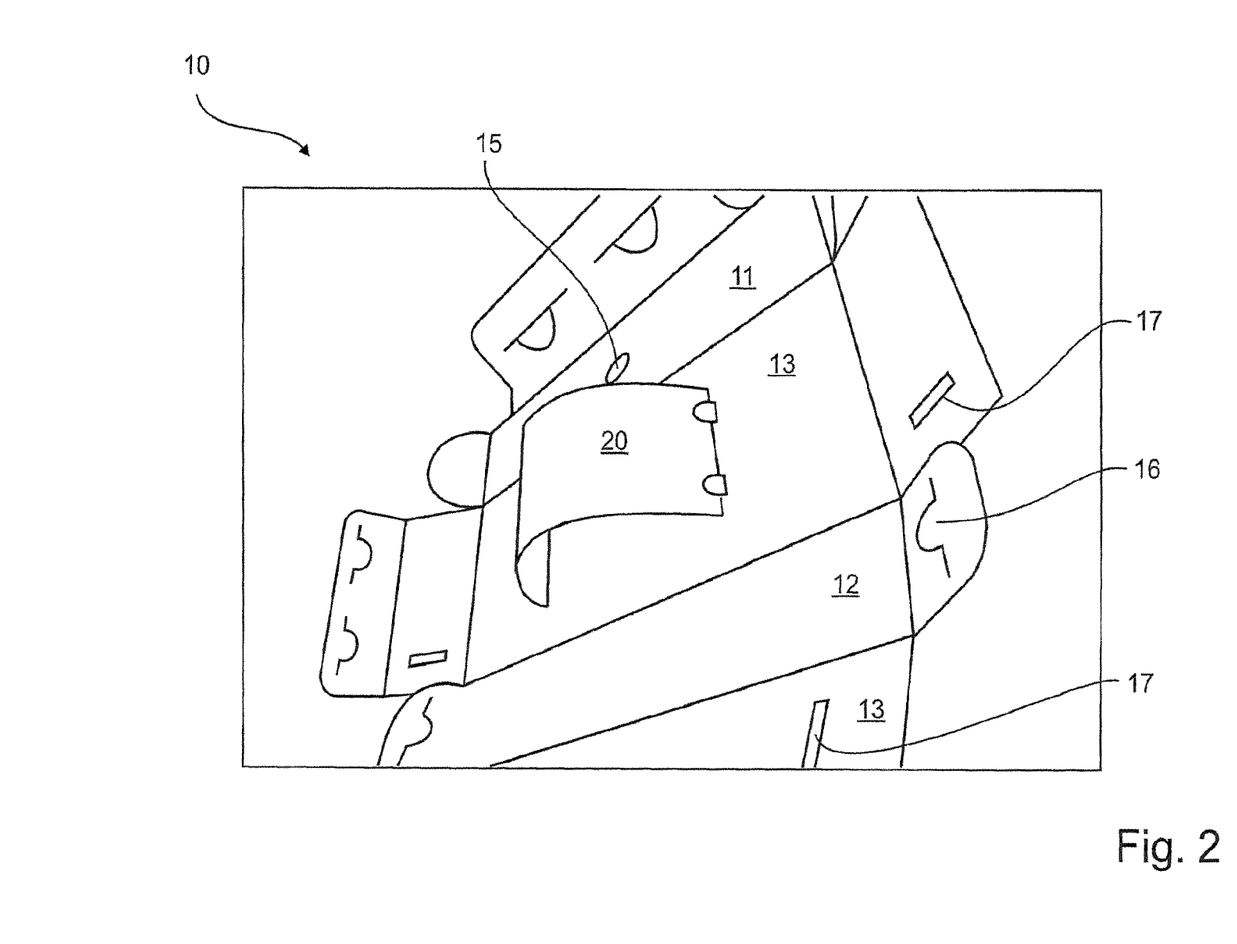
FIG. 2 shows a photograph of a first embodiment of the container of the device for the diagnosis of infestation before assembly.

FIG. 2 shows a photograph of a first embodiment of the container 10 of the device for the diagnosis of infestation before being assembled. The cover 11, bottom 12 and side walls 13 of the container 10 are punched out of a piece of foldable plastic material. Upon folding, each of the tabs 16 is pushed into the corresponding slots 17 so that the container remains in the folded shape. A strip of active compound 20 is attached to one side wall 13 of the container 10. This may be for example a section of a Bayvarol® strip, that is an active compound support with a polymer matrix and flumethrin as the active compound. The Bayvarol® strip is attached such that it is accessible to the bees from both sides. As the result of the contact, the active compound flumethrin is taken off the surface of the strip by the bees and, by means of bodily contact, transferred to all bees and the Varroa mites in the device. In addition to Bayvarol® strips, CheckMite® strips, for example, which contain coumaphos as the active compound, or Apivar® strips, which contain amitraz as the active compound, may also be used. The container 10 has an opening 15 of a size through which the bees can escape.

Figure 3:
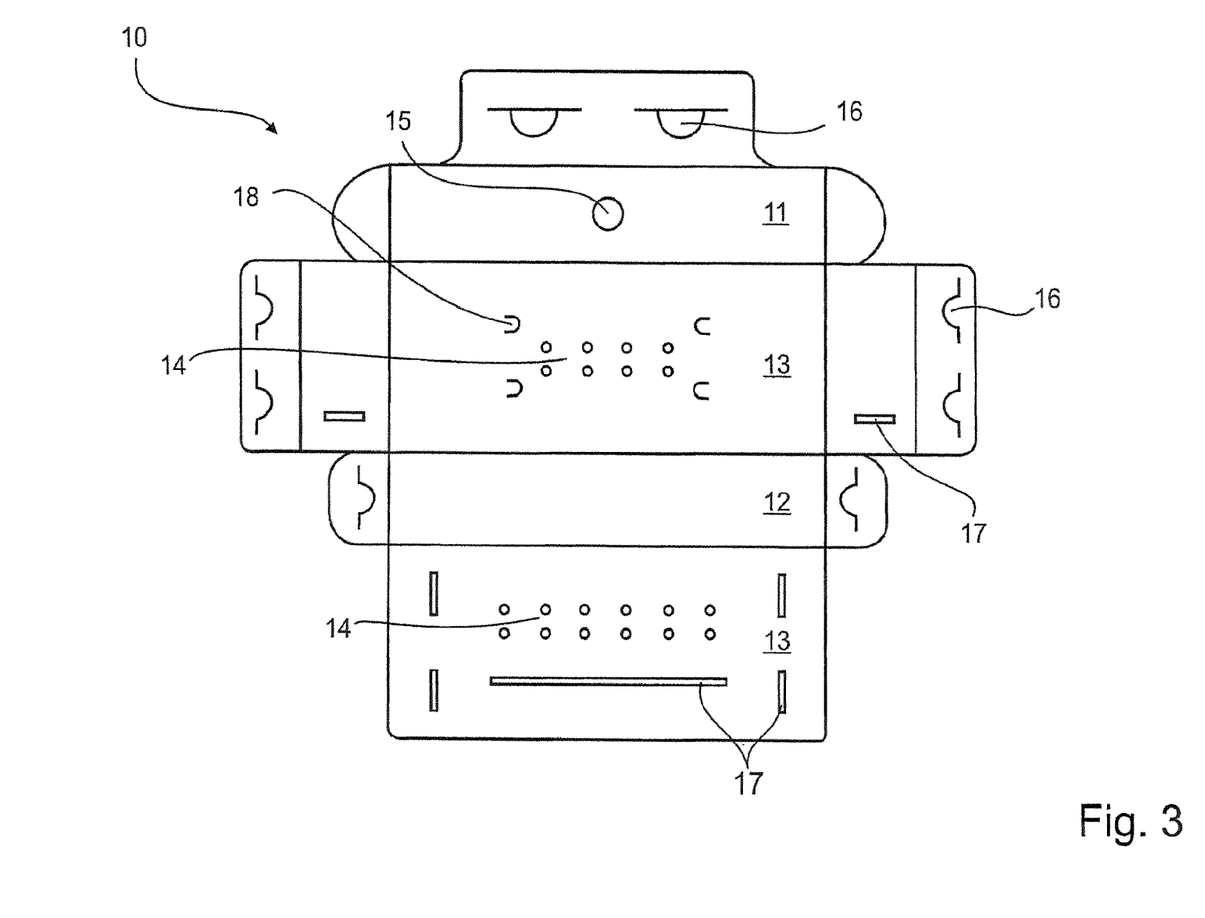
FIG. 3 shows a technical drawing of a first embodiment of the container of the device for the diagnosis of infestation before assembly.
Figure 8:
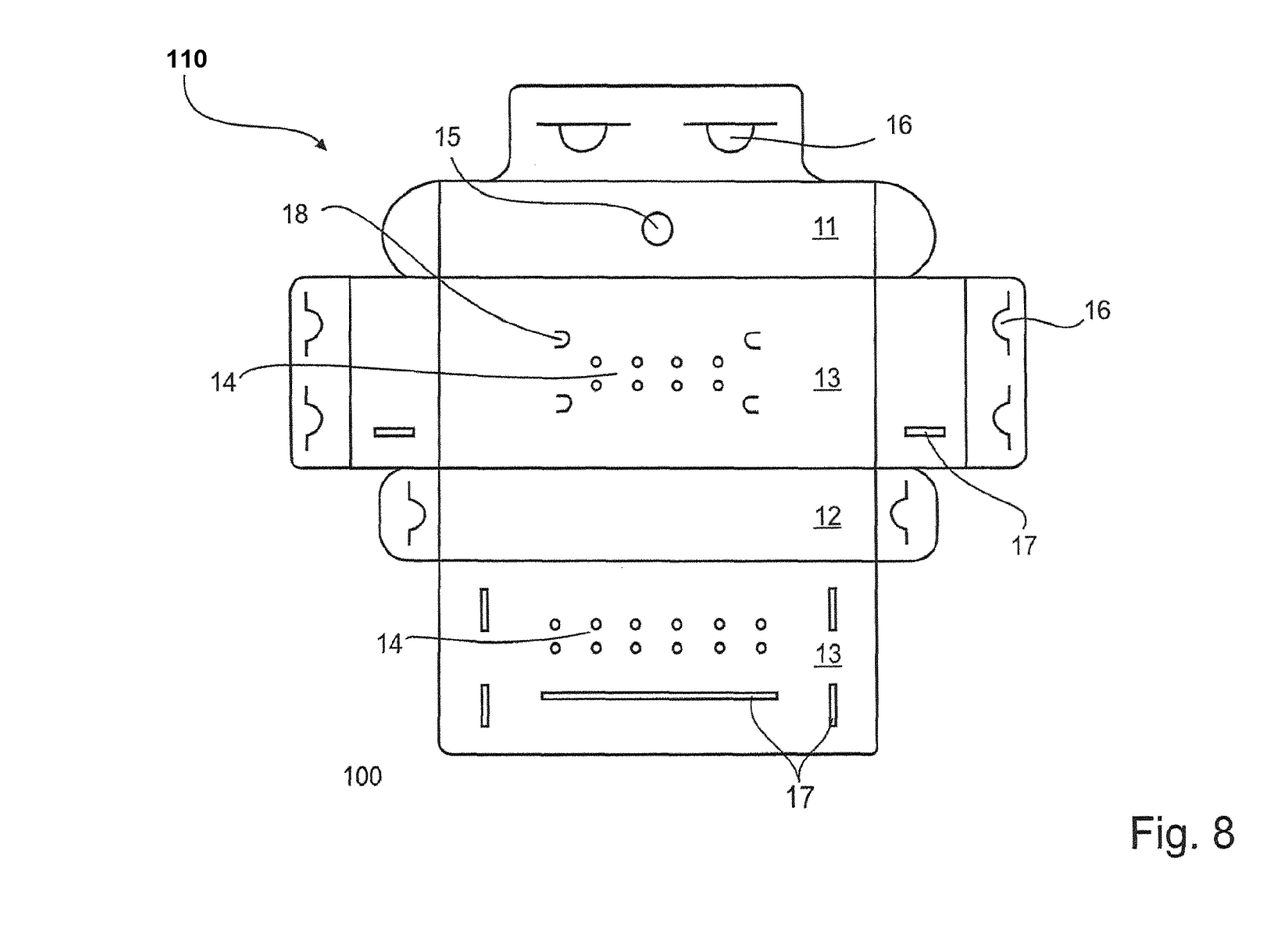
FIG. 8 shows a technical drawing of a second embodiment of the container of the device for the diagnosis of infestation before assembly.

FIGS. 3 and 8 show technical drawings of a first and second embodiment 10 and 110, respectively, of the container of the device for the diagnosis of infestation before being assembled. Identical features have the same characterization in the two figures. The following can be seen clearly:

11—cover
12—bottom
13—side wall
14—air holes
15—opening through which the bees can escape
16—tab
17—slit for accommodating a tab
18—retaining tabs for active-compound-containing strips The two embodiments shown differ merely in the fact that the retaining tabs 18 in FIG. 8 are in a different position in comparison with FIG. 3.

Figure 4:
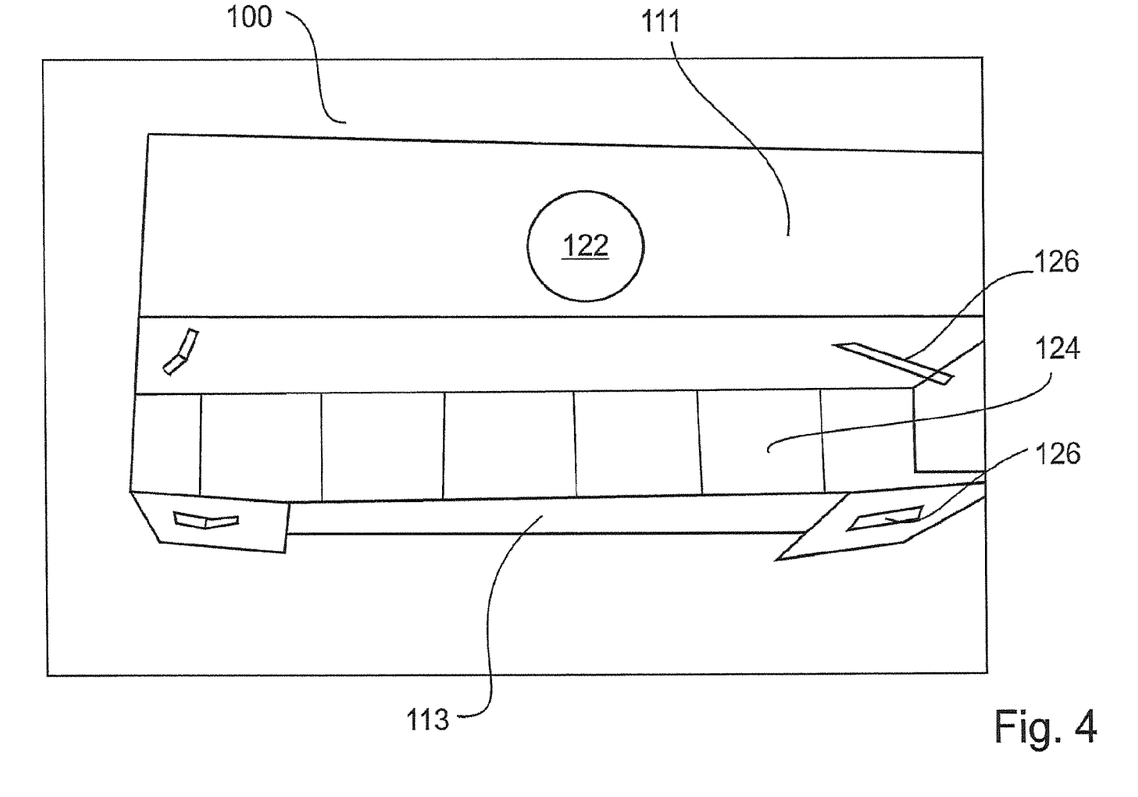
FIG. 4 shows a device for the diagnosis of infestation with a third embodiment of the container, in the fitted state with open cover.
Figure 5:
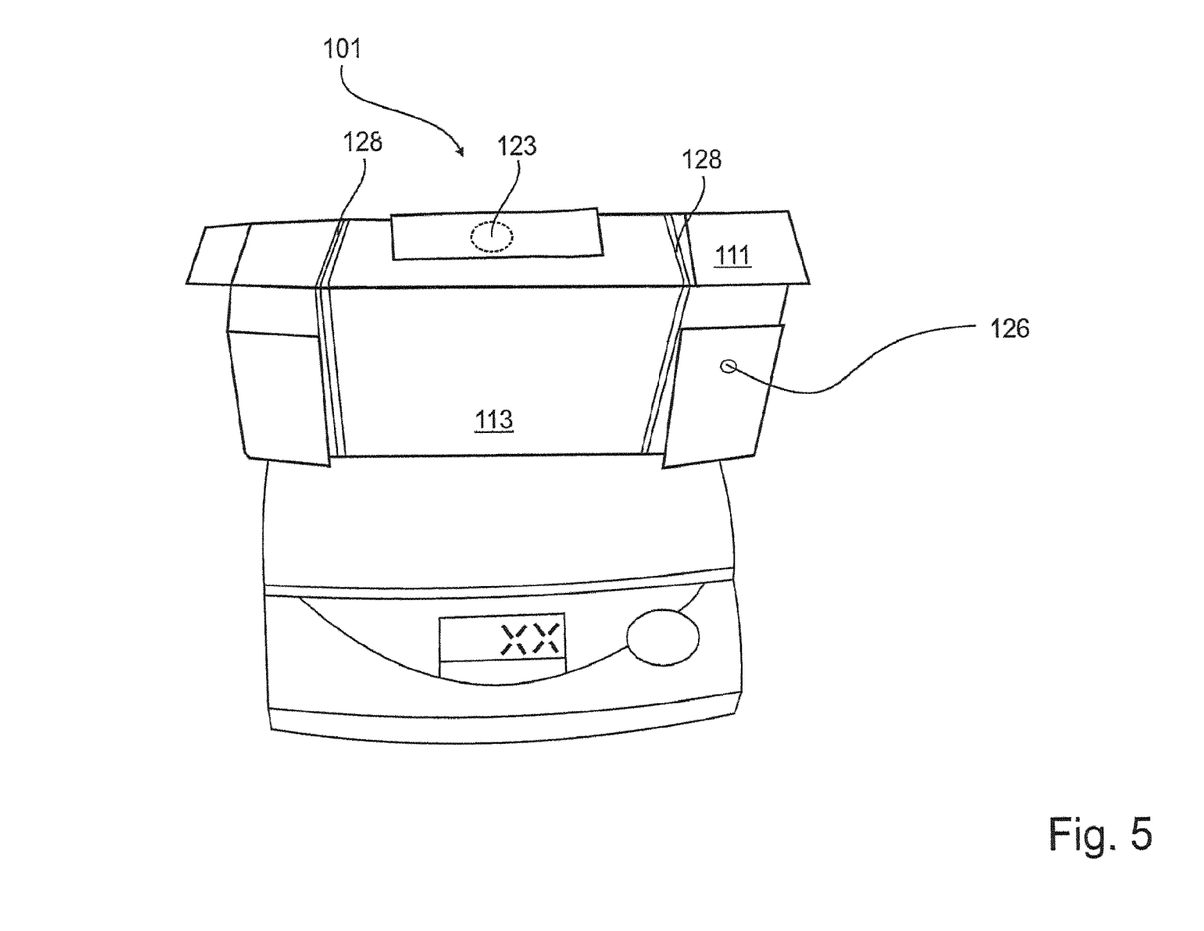
FIG. 5 shows a device for the diagnosis of infestation with a third embodiment of the container, which is assembled and filled with bees.

FIG. 4 and FIG. 5 show a device 100, 101 for the diagnosis of infestation with a third embodiment of the container in the assembled state. In FIG. 4, the top view with opened cover 111. In FIG. 5, the container is assembled and filled with bees. In this second embodiment, a foldable web plate made of plastic has been used for the container. The side walls 113 and the bottom are fixed by means of holes through which split pins 126 have been pushed. The cover 111 is fixed by means of elastic bands 128. An adhesive film 124 as per the Varroa Mite Screen Boards by Dadant & Sons Inc. is located on the bottom of the container. In the variant of the device 100 shown in FIG. 4, the opening in the cover 111, through which the bees can escape, is sealed on the interior side of the container by a clump of food dough 122. In the variant of the device 101 shown in FIG. 5, the opening in the cover 111 is sealed on the outside with a piece of paper.

Figure 6:
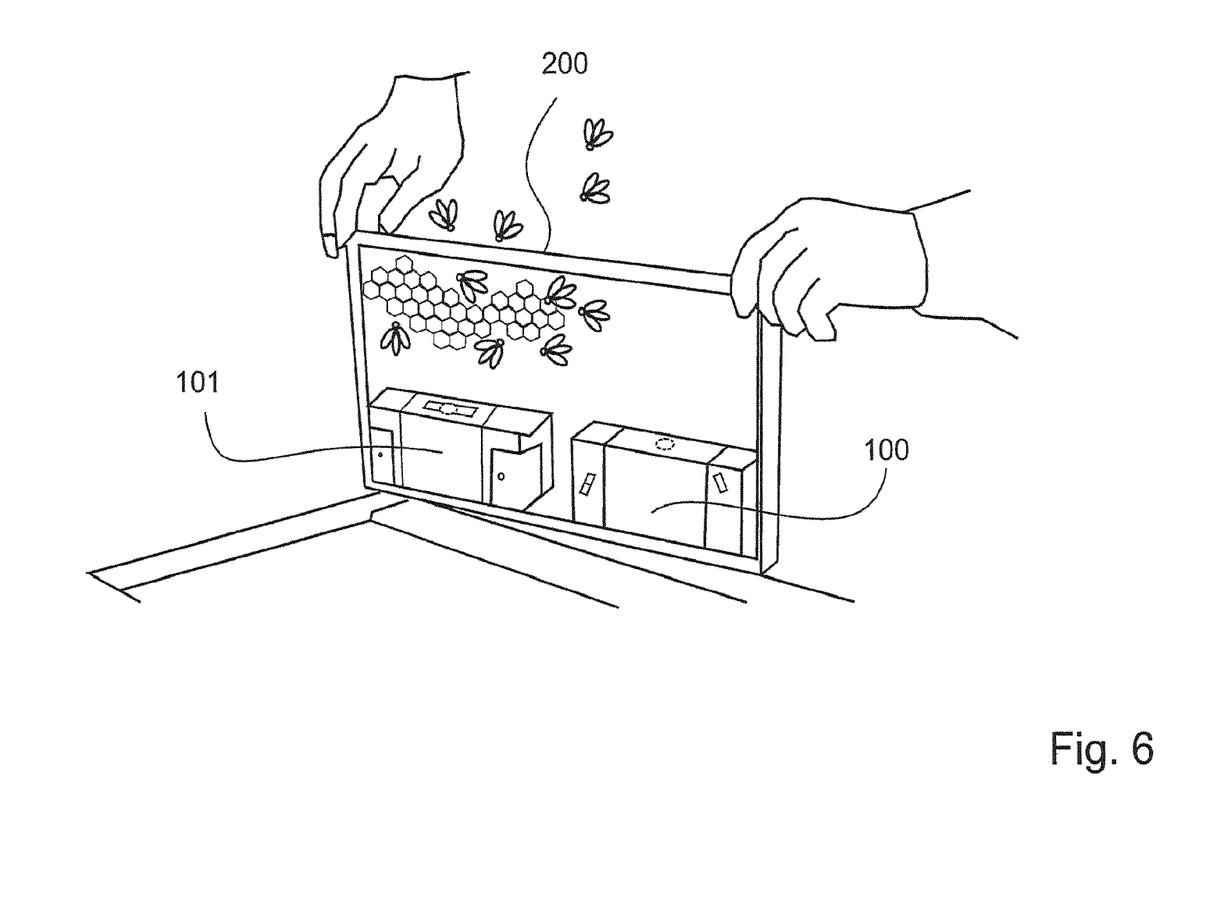
FIG. 6 shows two devices for the diagnosis of infestation in a honeycomb frame.

FIG. 6 shows two devices for the diagnosis of infestation 100, 101 which are attached in a honeycomb frame 200.

Figure 7:
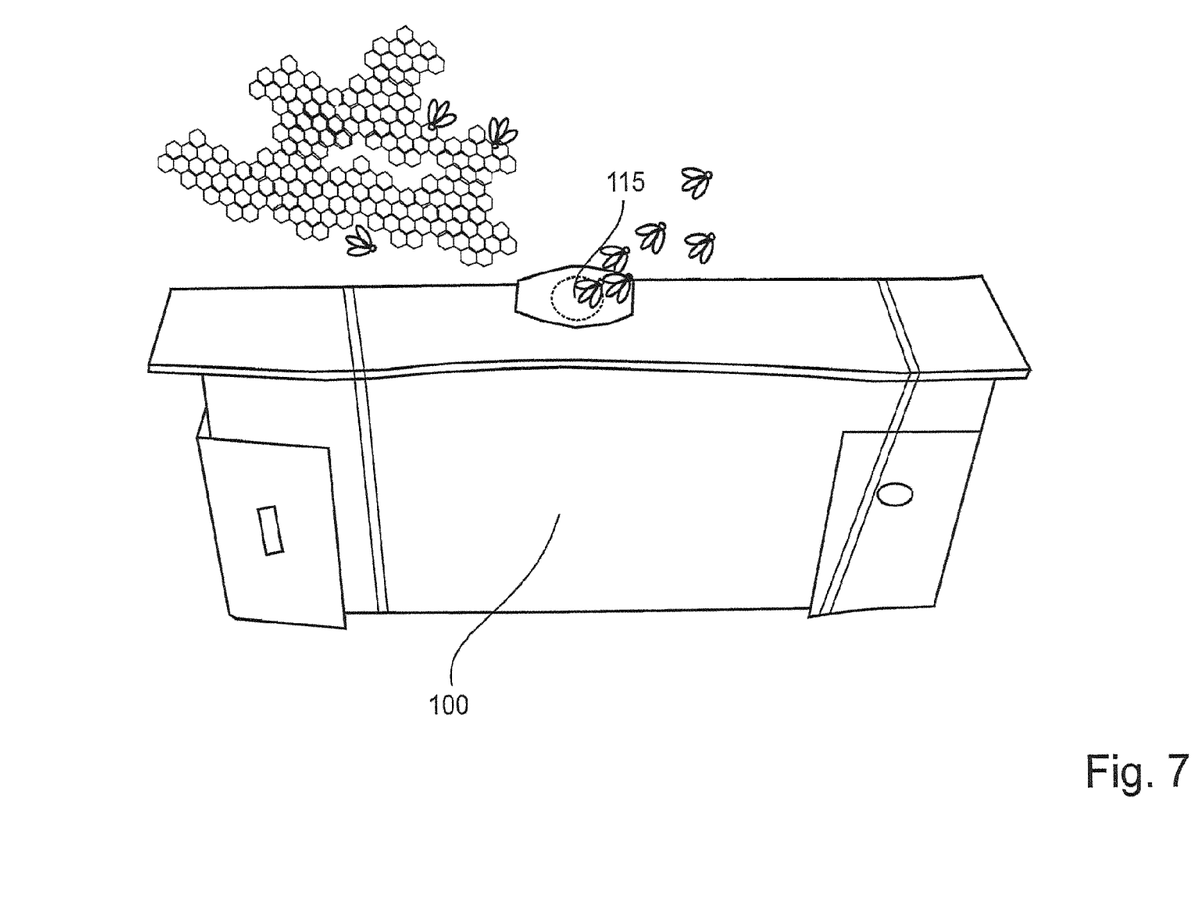
FIG. 7 shows how bees escape from a device for the diagnosis of infestation.

FIG. 7 shows how bees escape through the opening 115 in the cover of the device 100 for the diagnosis of infestation.

Over 100 infestation tests with in each case approximately 50 g of bees were carried out with a device 100 as per FIG. 4 to 7. The dimensions of the container used were: width w=30 mm, length l=150 mm and height h=60 mm. A Bayvarol® strip of dimensions 90 mm×approx. 30 mm was located on the wall of the container. After 6 hours or more, the bees were able to free themselves from the container and were thereafter located in a further, larger container in which the determination of the remaining *Varroa* mites which still adhered to the bees was carried out. The determination of these residual mites revealed ≥95% of the *Varroa* mites found in total had already dropped off the bees in the device 100 according to the invention, where they could be counted.

Figure 9:
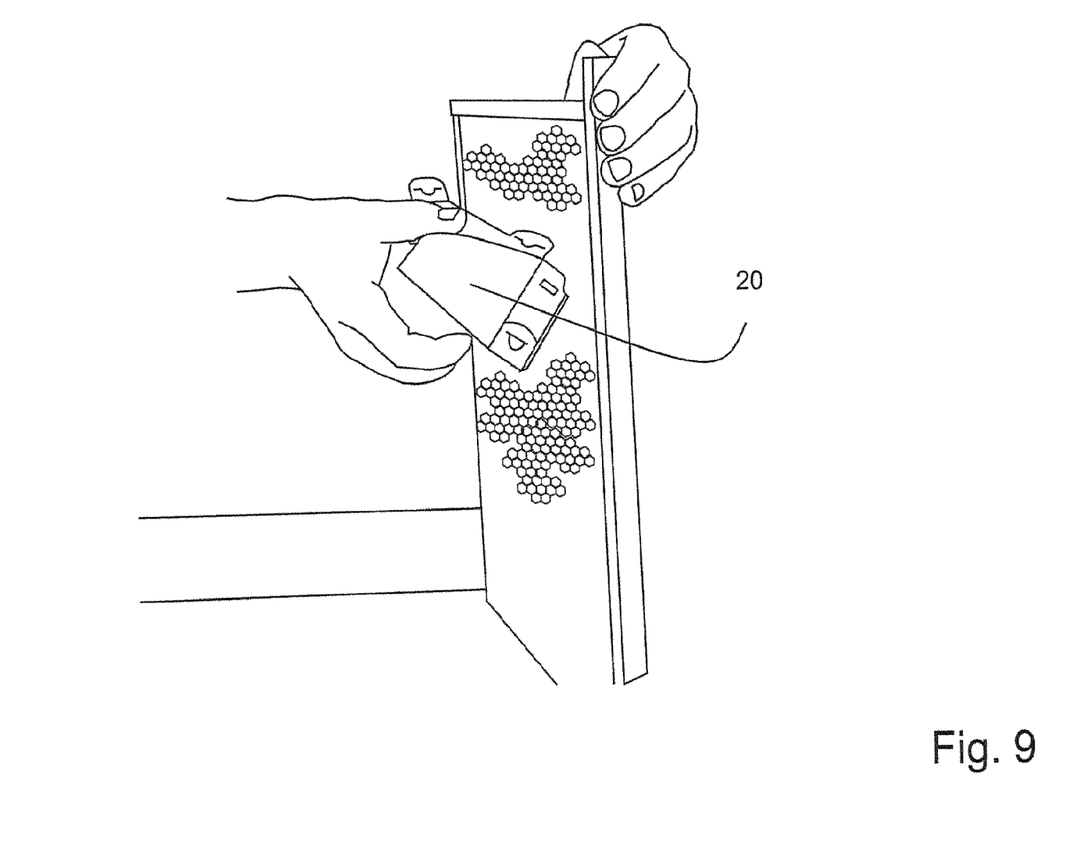
FIG. 9 shows how the container of the device for the diagnosis of infestation in the second embodiment is filled.

FIG. 9 shows how the container of the device for the diagnosis of infestation in the second embodiment is filled. The design of the container is such that filling is particularly simple. For filling, the opened box, whose opening points upwardly, is stroked from top to bottom over the bees which sit on the honeycomb. The former then "tip" over the edge into the container.

The invention claimed is:

1. A device for examining the infestation of honeybee colonies with *Varroa* mites quantitatively, comprising:
   a container with a bottom, side walls and a cover, the container defining an interior sized and shaped to receive a sample of honeybees therein, wherein the container comprises a material whose rigidity withstands the honeybees' chewing;
   an acaricide-containing active compound in the interior of the container, wherein the acaricide-containing active compound is configured to cause *Varroa* mites to drop off the honeybees, but does not harm the honeybees;
   an adhesive in the interior of the container at the bottom of the container, the adhesive configured to adhere to *Varroa* mites which have dropped from the honeybees received in the interior of the container,
   wherein the container has one opening through which the honeybees can escape the container,
   wherein the device further comprises an obstruction associated with the one opening which prevents the honeybees in the container from exiting the container through the one opening,
   wherein the obstruction is removable by the honeybees after more than three hours to allow the honeybees to escape from the container through the one opening, and
   wherein the height of the container h and a length of the container l are such that the container fills between 10% and 50% of an area extending from a honeycomb frame.

2. The device according to claim 1, wherein the width of the container b is in a first range of from 10 mm to 50 mm, a length of the container l is in a second range of from 50 mm to 428 mm, and a height of the container h is in a third range of from 20 mm to 405 mm.

3. The device according to claim 1, wherein the one opening of the container is located in one of the side walls or in the cover of the container.

4. The device according to claim 1, wherein the obstruction comprises food dough for the honeybees which seals the one opening of the container and which has a thickness, perpendicular to the container wall in which the one opening is located, in a range of from 10 mm to 30 mm.

5. The device according to claim 1, wherein the container includes a small tube defining the one opening, wherein the small tube is secured to one of the side walls or in the cover of the container.

6. The device according to claim 1, wherein the obstruction comprises one or more of coated paper, uncoated paper, cardboard and thin wood which seals the one opening of the container.

7. The device according to claim 1, wherein the container has ventilation openings whose dimensions are such that the honeybees in the container cannot escape through them.

8. The device according to claim 1, wherein the adhesive comprises an adhesive film having an adhesive side facing the cover of the container.

9. The device according to claim 1, further comprising a grid received in the interior of the container adjacent the bottom of the container, wherein the grid separates the interior of the container into an upper chamber and a lower chamber, wherein the adhesive is received in the lower chamber, wherein the grid is configured such that the *Varroa* mites which have dropped from the honeybees in the upper chamber, but not the honeybees, may pass through the grid and into the lower chamber.

10. The device according to claim 9, wherein the grid has a mesh size from 0.5 mm to 6 mm.

11. The device according to claim 1, further comprising an active compound support which is fixed to or hung on the cover or at least one of the walls of the container and includes the acaricide-containing active compound.

12. The device according to claim 11, wherein the active compound support is configured to release the acaricide-containing active compound by contact or by evaporation.

13. The device according to claim 1, wherein the acaricide-containing active compound is selected from the group consisting of flumethrin, amitraz, coumaphos, tau-fluvalinate, bromopropylate, macrocyclic lactone, organic acid and essential oil.

14. The device according to claim 13, wherein the active compound is an organic acid selected from the group consisting of formic acid, lactic acid, and oxalic acid.

15. The device according to claim 13, wherein the active compound is an essential oil selected from the group consisting of thymol, clove oil, citronella oil and a constituent thereof.

16. The device according to claim 11, wherein the bottom, the side walls, and the cover of the container are made of a single piece of foldable material.

17. The device according to claim 16, wherein the container comprises tabs and slits for assembling the container.

18. A device according to claim 1, fixed to a honeycomb frame.

19. A method of quantitatively examining the degree of infestation of honeybee colonies with *Varroa* mites, the method comprising:
   providing a device for examining the infestation of honeybee colonies with *Varroa* mites according to claim 1;
   inserting a sample of honeybees in the interior of the container;

after the bees escaped through the one opening collecting *Varroa* mites which have dropped from the honeybees received in the interior of the container wherein the collected *Varroa* mites are adhered to the adhesive;

recording the number of collected *Varroa* mites adhered to the adhesive; and determining if treatment of the honeybee colony is required based upon the number of collected *Varroa* mites adhered to the adhesive.

20. The method according to claim 19, wherein the sample of honeybees is approximately 50 g.

21. A method of examining the sensitivity of the *Varroa* mites of a honeybee colony to various acaricide-containing active compounds, the method comprising:

providing a first device according to claim 1 wherein the acaricide-containing active compound is a first acaricide-containing active compound;

providing a second device according to claim 1 wherein the acaricide-containing active compound is a second acaricide-containing active compound;

wherein the first acaricide-containing active compound and the second acaricide-containing active compound are different;

inserting a first group of honeybees from the honeybee colony in the interior of the first container;

after the bees escaped through the one opening of the first container collecting *Varroa* mites which have dropped from the honeybees received in the interior of the first container wherein the collected *Varroa* mites are adhered to the first adhesive;

recording the number of collected *Varroa* mites from the first container;

determining the sensitivity of the *Varroa* mites of the honeybee colony to the first acaricide-containing active compound; and inserting a second group of honeybees from the honeybee colony in the interior of the second container;

after the bees escaped through the one opening of the second container collecting *Varroa* mites which have dropped from the honeybees received in the interior of the second container wherein the collected *Varroa* mites are adhered to the second adhesive;

recording the number of collected *Varroa* mites from the second container; and determining the sensitivity of the *Varroa* mites of the honeybee colony to the second acaricide-containing active compound.

22. The method according to claim 21, wherein the first group of honeybees from the honeybee colony is approximately 50 g, and wherein the second group of honeybees from the honeybee colony is approximately 50 g.

* * * * *